SYNC SEPARATOR AND AGC CIRCUITS FOR TV RECEIVERS

Filed Aug. 23, 1952 4 Sheets-Sheet 1

INVENTORS
EUGENE O. KEIZER
& MARLIN G. KROEGER

BY [signature]

ATTORNEY

SYNC SEPARATOR AND AGC CIRCUITS FOR TV RECEIVERS

Filed Aug. 23, 1952 4 Sheets-Sheet 2

WAVEFORM AT CATHODE OF TUBE 55 (HORIZ. RATE)

WAVEFORM AT CATHODE OF TUBE 55 DURING VERTICAL SYNC PULSE

INVENTORS
EUGENE O. KEIZER
& MARLIN G. KROGER

BY [signature]
ATTORNEY

SYNC SEPARATOR AND AGC CIRCUITS FOR TV RECEIVERS

Filed Aug. 23, 1952 4 Sheets-Sheet 3

INVENTORS
EUGENE O. KEIZER
& MARLIN G. KROGER
BY [signature]
ATTORNEY

INVENTORS
EUGENE O. KEIZER
& MARLIN G. KROGER
BY [signature]
ATTORNEY

United States Patent Office 2,735,002

Patented Feb. 14, 1956

2,735,002

SYNC SEPARATOR AND AGC CIRCUITS FOR TV RECEIVERS

Eugene O. Keizer, Princeton, N. J., and Marlin G. Kroger, Maywood, Ill., assignors to Radio Corporation of America, a corporation of Delaware Application August 23, 1952, Serial No. 306,004

6 Claims. (Cl. 250—20)

This invention relates to radio receivers adapted to receive signals of the television type, and is applicable to the synchronizing signal separator circuits and automatic gain control (AGC) circuits of television receivers.

When receiving signals without interference commercial television receivers generally show satisfactory picture stability. However, under certain adverse conditions, such as when interference of the high energy ignition type occurs, the picture may become unsteady or completely unsynchronized even though the picture content itself would still be usable if the synchronizing were stable. This failure is often the result of noise pulses charging up the sync separator and AGC circuits of the receiver, causing the useful sync output to be suppressed and obscured.

In most television receivers the first sync separator circuit is self-biasing so that conduction occurs only on the peaks of the composite video signal which is the sync region of that signal. As the video amplitude varies, the sync separator bias follows the changes so the level of the conduction region follows the sync portion of the signal. However, if there are long or numerous peaks of interference having greater amplitude than the sync portion of the signal, the self-bias voltage will tend to be too great and all or part of the sync portion of the signal will be lost. At the same time the AGC voltage may increase due to the interference, thus reducing the signal and placing an even greater burden on the sync separator. If the amplitude of interference is limited to be about the same as sync peaks, or is inverted out of the sync portion of the signal, then self-biased sync separators can maintain sync output in the presence of the interference.

One approach would be to replace self-bias of the sync separator with bias set by other circuits in the receiver that are relatively immune to interference. The performance then would depend upon the accuracy and reliability to which the D. C. bias on the sync separator can be set to correspond to the sync portion of the signal under all conditions of signal level and interference conditions.

If a given television receiver had high maximum gain, and a noise-immune AGC system which accurately adjusted the gain of the receiver for all signal levels until the sync peaks reached a certain D. C. level at the output of a D. C.-coupled video amplifier, it would be possible to bias the sync separator to operate well at that level and a noise immune sync output would result. In practice, however, there are usually three difficulties to such an arrangement.

First, the loop gain or speed of response of the AGC circuit may be insufficient to maintain the signal level sufficiently constant to keep the sync portion of the video output within the operating range of the sync separator, resulting either in loss of sync, or in video information being present in the sync output.

Second, the AGC voltage may be affected by interference, resulting in failure to maintain the proper signal level and in loss of sync.

Third, the signal may sometimes be so weak that the maximum gain of the receiver may be insufficient to maintain full video output, again resulting in loss of sync.

The circuit arrangement according to the present invention overcomes these difficulties and consequently results in a high performance sync and AGC system which is more immune to noise than conventional circuits. It must be carefully designed into a particular receiver design, but once so designed it is a reliable and non-critical circuit.

An object of this invention is therefore, to provide an improved synchronizing signal separator circuit for television receivers.

Another object of this invention is to improve the immunity of television receivers to noise impulses.

A further object of this invention is to provide economical synchronizing signal separator and automatic gain control circuits for television receivers.

According to the illustrated embodiment of the present invention, a synchronizing signal separator is fed a television signal which has its D. C. component preserved. The synchronizing signal separator is externally biased (not self-biased) so that it will separate the synchronizing pulses from the video signal. The synchronizing signal separator is made to have a definite limiting level for applied signal in the direction of synchronizing pulses. High gain means are provided for holding the output of the synchronizing signal separator near but not beyond the limiting level of the synchronizing signal separator. These last means may include means for developing an AGC voltage which is a function of the closeness of the sync tips to the limiting level of the synchronizing signal separator and may also include circuits controlled by the AGC to vary the external bias on the synchronizing signal separator.

Other and incidental objects of the present invention will be apparent to those skilled in the art from a reading of the following specification and an inspection of the accompanying drawings in which.

Figures 3, 4:
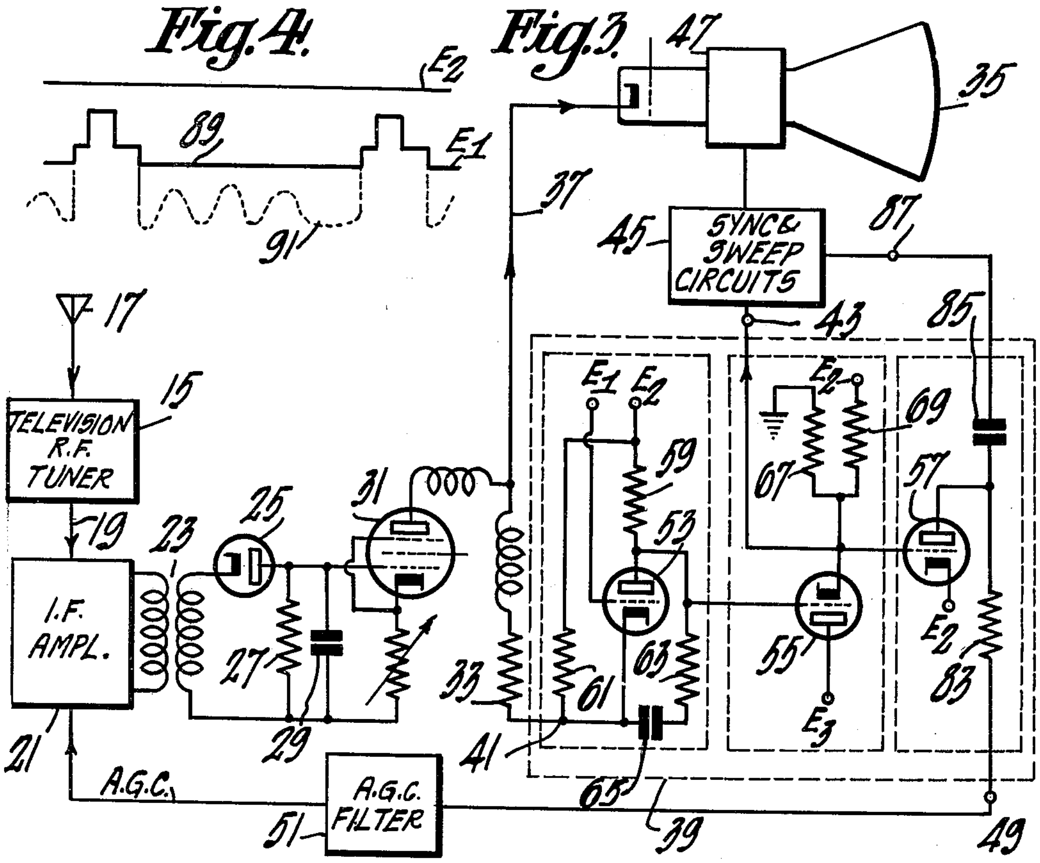
Figure 3 shows a circuit diagram of an embodiment of the present invention.
Figure 6A:
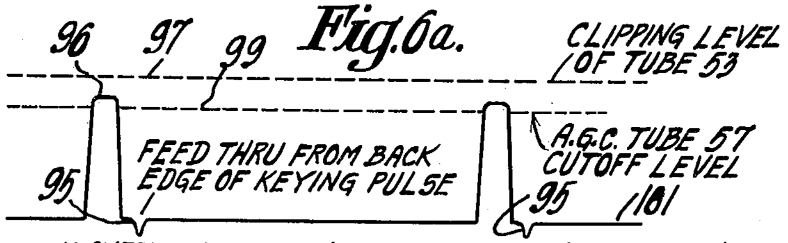
Figure 6B:
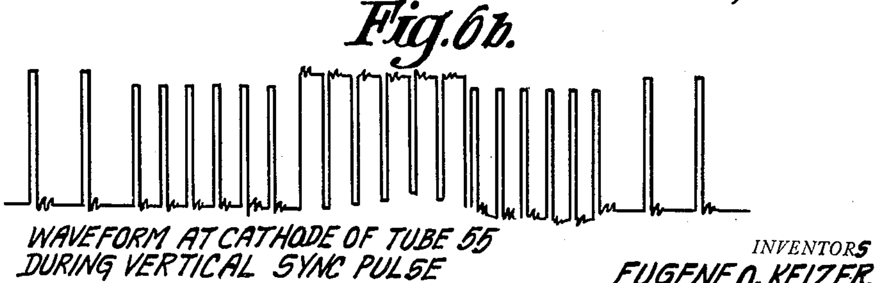
Figure 7:
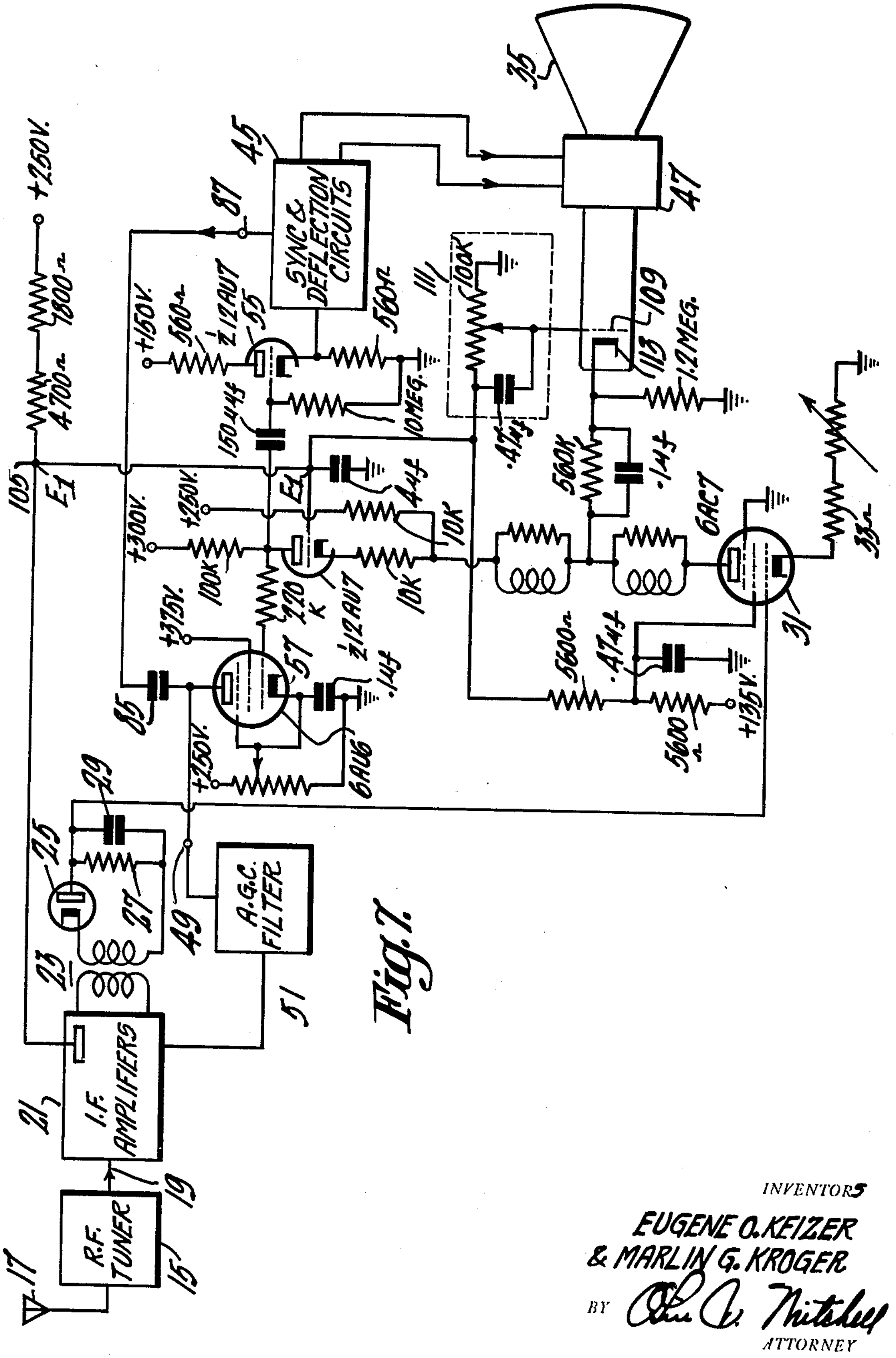
Figure 8:
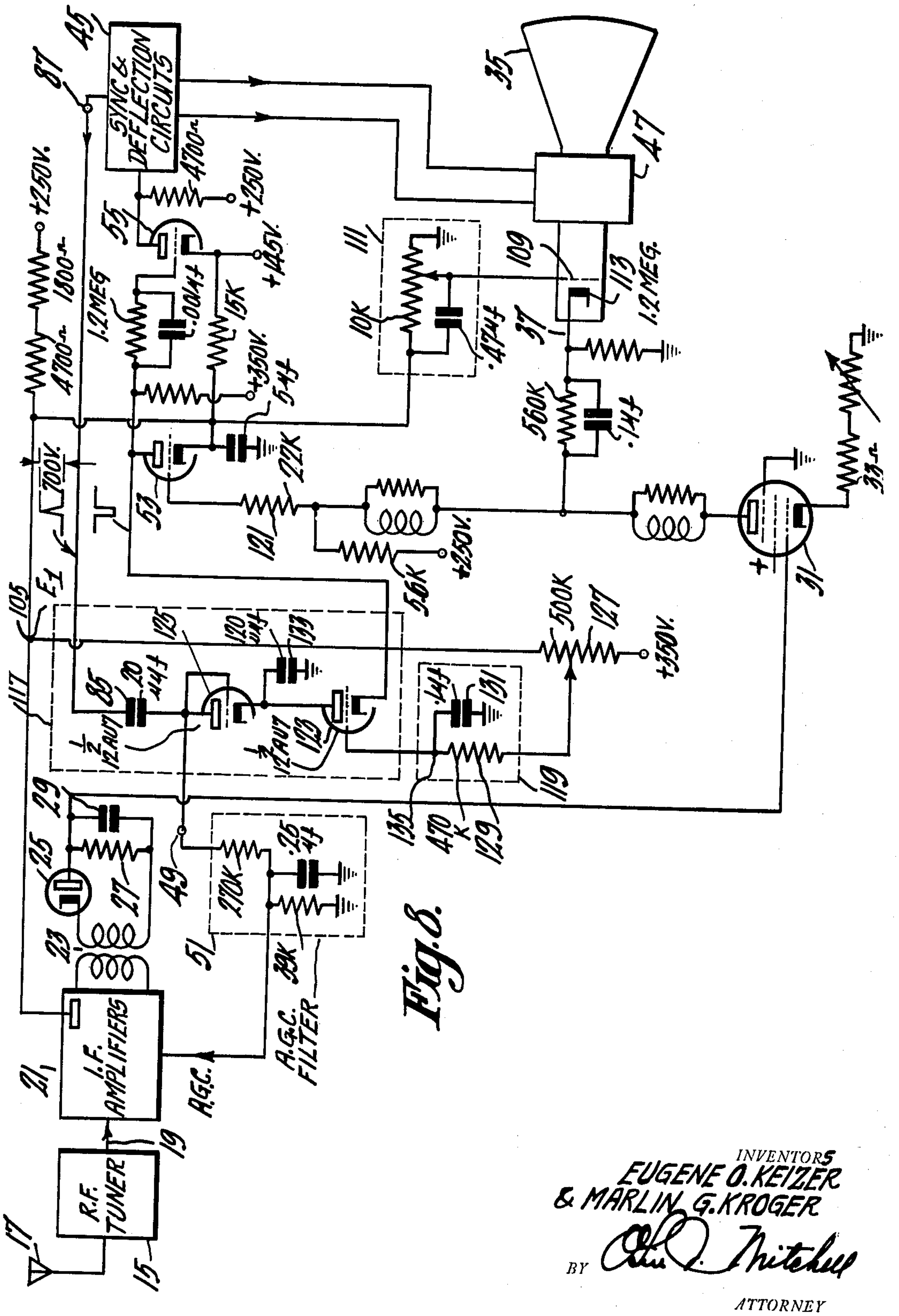

Figures 4, 5, 6*a* and 6*b* show waveforms useful in the understanding of the operation of the circuit of Figure 3; and Figures 7 and 8 show circuit diagrams of other embodiments of the present invention.

Figure 1:
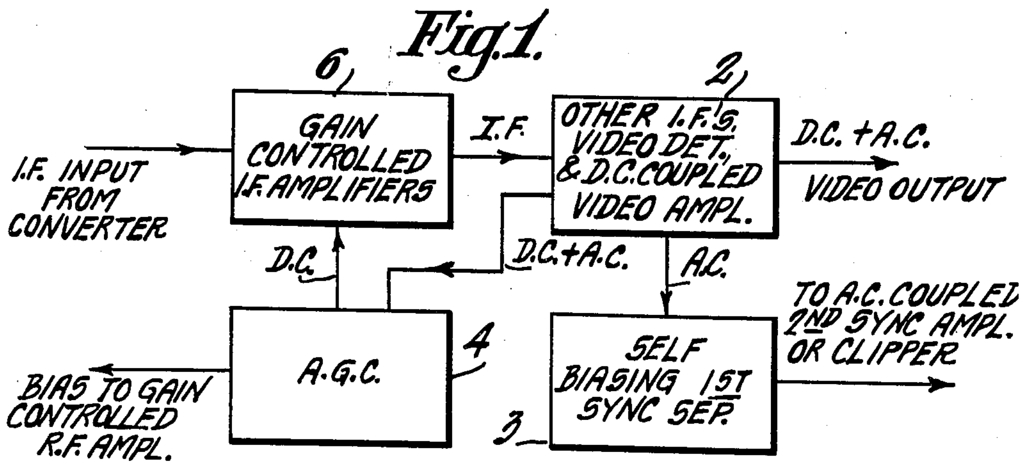
Figure 1 shows a block diagram of one type of a conventional synchronizing signal separator and AGC circuit.

Referring to Figure 1, there is shown a block diagram of the sync and AGC systems. A portion of the output signal of the video amplifier 2 is applied to a self-biasing first sync separator 3, and also to an AGC voltage-generating circuit 4, as for example, a keyed AGC tube. On strong signals the AGC voltage reduces the gain of the controlled amplifier stages to the point where an approximately fixed reference level of output signal results.

Figure 2:
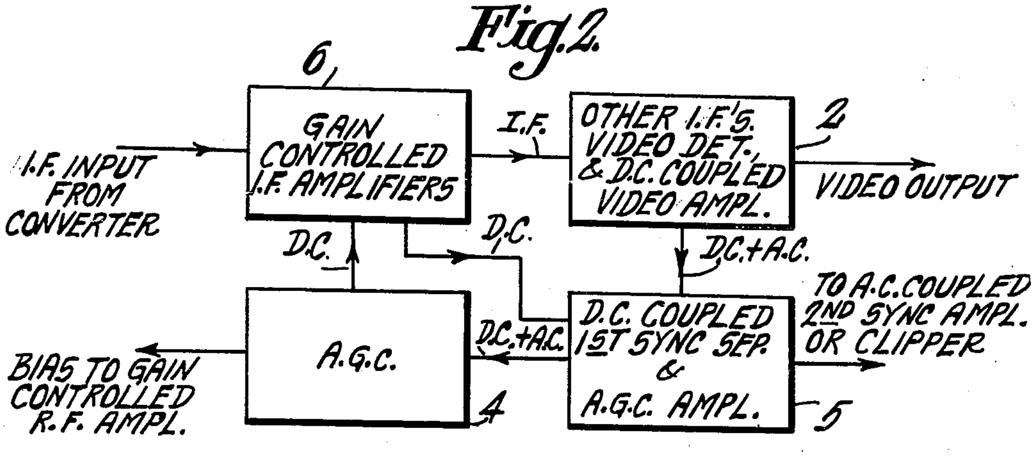
Figure 2 shows a block diagram of a synchronizing signal separator and AGC in accordance with one form of the present invention.

A block diagram of the improved sync and AGC system in accordance with one form of the invention is shown in Figure 2. The self-biasing first sync separator 3 has been replaced with an externally-biased D. C.-coupled amplifier stage 5 which serves the double purpose of sync separation and additional AGC amplification. Furthermore, the external bias, which determines the operating levels for the combination AGC amplifier and sync separator 5 is not fixed, but rather is a controlled D. C. voltage, obtained from the plate circuit of one or more gain controlled amplifiers 6 which varies with the amount of AGC bias.

Stated in general terms, the effects of the combination D. C. sync separator and AGC amplifier 5 are:

First to provide a common reference or bias for the sync separator and the AGC system so the gain in the AGC loop will automatically hold the signal level within the proper region for good sync separation.

Second, to increase the gain in the AGC loop so the signal level is more accurately controlled than would be possible otherwise, and Third, to clip noise pulses close to the sync peaks, thus considerably reducing their effect on the AGC voltage.

These effects largely overcome the first and second difficulties mentioned previously for D. C.-coupled sync separator circuits.

To overcome the third difficulty some means can be provided for lowering the sync separator bias to follow the video output on very weak signals. Such a variable bias can be obtained at the low voltage terminal of a resistor connected in series with the plate current of the gain-controlled I. F. amplifier stages 6, at this point the voltage drops when a weak signal is being received due to the increased current in the amplifier tubes at low AGC voltages.

DESCRIPTION OF FIGURE 3

Referring now to Figure 3, there is shown a television R. F. tuner 15 fed by an antenna 17. The R. F. tuner 15 is connected by means of leads 19 to an I. F. amplifier stage 21. The I. F. amplifier stage 21 is coupled by means of transformer 23 to a video detector 25. Resistor 27 and capacitor 29 are associated with the video detector 25. The output of the video detector 25 is fed to the grid of a video amplifier tube 31 having a load resistor 33. The output of the video amplifier tube 31 is fed to the cathode of kinescope 35 over lead 37.

A synchronizing signal separator and automatic gain control (AGC) circuit according to the present invention is shown in box 39. The signal input terminal of the circuit 39 is at point 41. The separated synchronizing signal is available at one of its output terminals at point 43. Point 43 is connected to the synchronizing and sweep circuits 45, which are in turn connected to the deflection yoke 47 of kinescope 35. An automatic gain control (AGC) potential is available at another of its output terminals at point 49. Point 49 is connected through an AGC filter 51 to the I. F. amplifier stage 21 of the receiver.

The synchronizing signal separator and AGC circuit, enclosed in box 39, comprises two sync separator tubes 53 and 55 and an AGC tube 57. Positive supply voltages $E_1$, $E_2$, and $E_3$ are provided. The value of $E_1$ should normally be suitable for the plate supply voltage for the video amplifier tube 31, while $E_2$ can be of the order of fifty volts more positive than $E_1$, and $E_3$ can be 50 to 100 volts more positive than $E_2$.

The cathode of tube 53 is connected to point 41. The grid of tube 53 is connected to $E_1$ to provide it with a fixed potential. The anode of tube 53 is connected to $E_2$ through a resistor 59 to obtain its anode supply voltage. A resistor 61 is connected between $E_2$ and point 41. A resistor 63 and a capacitor 65 are connected in series between the anode and cathode of tube 53 to provide for the compression of sync tips.

The anode of tube 53 is D. C. connected to the grid of tube 55. The anode of tube 55 obtains its anode voltage at $E_3$. The cathode of tube 55 is connected to ground through resistor 67, and to $E_2$ through resistor 69, to bias the cathode of tube 55. The cathode of tube 55 is also connected to point 43, and to the control grid of tube 57. The cathode of tube 57 is connected to $E_2$ to obtain its proper bias. The anode of tube 57 is connected through resistor 83 to point 49 at which the AGC voltage is obtained, and through capacitor 85 to point 87 at which positive keying pulses, obtained from the horizontal sweep circuit, are available.

GENERAL OPERATION OF THE CIRCUIT OF FIGURE 3

In operation, the AGC holds the signal at the input to the sync separator at just the right level for good noise clipping and sync separation. This means that it maintains the signal level at point 41 so that on sync peaks tube 53 is near cutoff and its anode voltage is near the supply voltage $E_2$.

The cathode of the second sync separator tube 55 which is connected as a cathode follower, follows this voltage in the sync peak region, but due to the initial bias applied by the voltage divider, 69 and 67, its negative swings are limited, thus clipping the video side of the sync signal. Because D. C.-coupling exists in the circuits between the video detector 25 and tube 55, the level of sync peaks across resistor 67 depends upon the signal amplitude, and can be used for AGC purposes. This is done by applying the output of tube 55 to the grid of the keyed AGC tube 57, whose cathode is connected to $E_2$. The anode of tube 57 receives a large positive keying pulse from the horizontal deflection circuits through capacitor 85. This capacitor charges up due to conduction of tube 57 during the keying pulses, and discharges between keying pulses through resistor 83 to the AGC filter 51 thus developing the AGC voltage.

The AGC voltage developed is particularly noise immune because it is controlled by the sync separator output in which the noise has already been suppressed and keying the AGC tube by a pulse from the horizontal deflection circuits provides considerable protection from noise due to time gating.

DETAILED DESCRIPTION AND OPERATION OF THE CIRCUIT OF FIGURE 3

*First sync separator tube 53 and its circuit*

As shown in Figure 3, the video amplifier is conventional execpt for the connection of the video load resistor to point 41 instead of directly to $E_1$, the supply voltage. Using this connection, the video amplifier operates with normal gain and load impedance during the video portion of the signal since the grid and cathode of tube 53 act as a diode clamp to prevent point 41 from becoming more than slightly negative with respect to $E_1$. However, during the sync portion of the signal, tube 53 approaches cutoff, making the impedance seen by the video amplifier at point 41 large compared to its value during the video portion of the signal. During the sync portions of the signal the paths between point 41 and $E_2$ have high impedances compared to the impedance during the video portion of the signal. The sync portions of the signal are therefore amplified more than they would be by a conventional video amplifier circuit. In other words, the video amplifier "sees" point 41 as a high impedance during the sync portion and a low impedance during the video portion of the signal, resulting in amplified sync and compressed video signal there.

The solid line 89 in Figure 4 represents the signal at point 41 with reference to the voltages $E_1$ and $E_2$, while the dotted curve 91 represents the video portion of the voltage at point 41 that would appear if the clamping action of tube 53 were not functioning.

Referring again to Figure 3, it will be seen that a resistor 61 is shown connected between point 41 and $E_2$. This resistor 61 supplies some current to the video amplifier even during sync tips (when tube 53 is essentially cut off). In operation, the input to the video amplifier tube 31 is just sufficient to reduce its plate current during sync tips to the current supplied by resistor 61. In other words, the amount of current supplied by resistor 61 determines the portion of the video amplifier tube characteristic over which normal operation occurs. When the value of resistor 61 is increased, so the current it supplies decreases, the video amplifier is driven harder, making the available video output larger. However, if resistor 61 is made too large, the sync and black region of the video signal are compressed due to the nonlinearity of the video amplifier tube characteristic near cutoff. A value of resistor 61 should be chosen which, from a consideration of the amplifier tube characteristics, allows the maximum video drive without undesirable compression of the black portion of the video signal.

The voltage to which resistor 61 is returned also affects the current through resistor 61 and therefore also enters into the above considerations. In addition, the voltage to which resistor 61 is returned is the maximum voltage to which point 41 can rise when the video amplifier is completely cutoff, as, for example, during strong noise pulses. Therefore, resistor 61 should not be returned to a voltage which is excessively high. In Figure 3 resistor 61 is shown returned to $E_2$, which was found to be a good value of voltage in practice.

The voltage to which point 41 rises when the video amplifier is completely cutoff, such as during a strong noise impulse depends upon the value of resistor 61, and in general will be somewhat more positive than sync peaks.

The voltage appearing at the anode of tube 53 is an amplified version of the voltage appearing at point 41, except that the peaks are somewhat compressed. Because tube 53 has cathode input, the signal in its output has the same phase as the input signal, i. e., there is not the usual phase reversal in the amplifier stage. The impedances appearing in the anode circuit of tube 53 are resistor 59, resistor 63, capacitor 65, and the tube and wiring capacities. Capacity 65 is sufficiently large to appear as a low impedance to horizontal sync pulses so that for them resistors 59 and 63 are effectively in parallel. The parallel combination of resistor 59 and 63 may have a value of around 50,000 to 80,000 ohms, and care should be taken to keep the wiring and tube capacity low if the edges of the horizontal sync pulses are to remain steep.

As tube 53 approaches cutoff its gain decreases and for this reason the sync peaks are compressed in the plate circuit as compared to the cathode circuit. This compression is desirable because it results in cleaner, more nearly constant-amplitude sync pulses in the presence of heterodyne types of interference and when receiving very weak signals.

The effective compression is increased by the connection of resistor 63 and capacitor 65 from the anode back to the cathode of tube 53. This connection is double acting in that it provides for some feedthrough from the cathode as well as some positive feedback to it. Both actions compress the tips of the sync.

The positive feedback action is more effective when tube 53 is conducting a reasonable amount of anode current than when it is near cutoff, thus compressing the peaks of sync, which occur near cutoff. The feedthrough action is effective in the following manner:

Between sync pulses, when tube 53 is fully conducting and its anode drops to a potential only a few volts above $E_1$ and the voltage at point 41, resistor 63 discharges capacitor 15 to a very low voltage. During a horizontal sync pulse, when tube 53 is just cut off, its anode voltage does not reach $E_2$ since capacitor 65 is a low impedance, but instead reaches a voltage between that of $E_2$ and that of point 41 and determined by the voltage division between resistors 59 and 63. When point 41 is driven up beyond cutoff of tube 53, the voltage at its anode will continue to increase somewhat due to feedthrough resistor 63 and capacitor 65 and can even be made equal to $E_2$.

Figure 5:
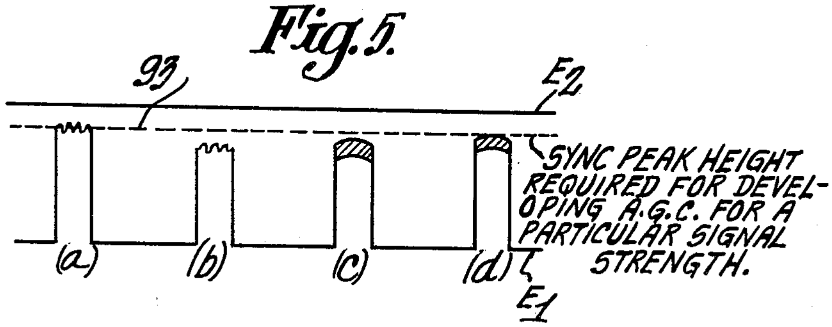

Figure 5 illustrates the operation of resistors 59, 63 and capacitor 65. At (*a*) in Figure 5 it has been assumed that resistor 63 and capacitor 65 have been omitted. For a particular signal level the sync peaks just reach a certain voltage shown by a dotted line 93 which represents a level at which sufficient AGC voltage will be developed to establish equilibrium. Suppose now that this AGC voltage is considered as being fixed at this voltage while resistor 63 and capacitor 65 are connected between the anode of tube 53 and $E_1$ instead of between the anode of tube 53 and point 41. The output at the anode of tube 53 will be reduced as shown in (*b*). However, if resistor 63 and capacitor 65 are reconnected from the anode of tube 53 to point 41, there will be a contribution from the voltage at point 41 which will appear at the anode in addition to that shown in (*b*). This increment is shown in (*c*) as the shaded portion. Now if the AGC circuit is again allowed to act, the gain will increase slightly until the cathode of tube 53 is driven beyond cutoff enough to restore the peaks of sync to approximately the original level, as shown in (*d*). However, since only a portion of the sync at point 41 reaches the anode of tube 53 through resistor 63 and capacitor 65, the peak of sync represents a compressed version of the original sync. In other words, use of the feedback circuit results in compression of the small variations in the waveshape of the top of each horizontal sync pulse and thereby causes the sync pulses to appear more square-topped.

The difference in voltage between $E_2$ and $E_1$ determines the effective anode supply voltage for tube 53. By making $E_2$ only slightly greater than $E_1$ the effective anode voltage for tube 53 and hence also its cutoff voltage can be kept small; a difference in the order of 40 to 50 volts was found in practice to produce a substantial sync output and yet to be uncritical to supply voltage variations.

*Second sync separator tube 55 and its circuit*

Returning now to Figure 3, it can be seen that tube 55 is connected as a form of cathode follower circuit. Tube 55 can be considered to be a second sync separator tube. The voltage divider comprising resistors 67 and 69 establishes a bias which restricts the range of the tube 55 in the negative signal direction and thereby clips the video end of the sync pulses. The impedance presented by resistors 67 and 69 is the cathode load impedance of tube 55, and should be low to reduce the coupling between the horizontal and vertical circuits feeding from their junction and to reduce the amount of voltage developed at this point by the horizontal pulse used for AGC. In practice values of resistances, which in the absence of conduction 67 and 69, establish the voltage at the cathode of tube 55 about 20 to 35 volts below $E_2$, and which present about 10,000 or less ohms impedance to the cathode of tube 55, have been found to work well. During conduction of tube 55 its low cathode output impedance is in shunt with the impedance presented by resistors 67 and 69, thus making the sync output impedance very low.

The plate supply $E_3$ should be in the order of 50 or more volts above $E_2$ to insure good cathode follower operation of tube 55. In cases where sync output of negative polarity is also desired, a resistance in the order of a few thousand ohms can be placed in series with the plate lead of tube 55 and the sync coupled out from the plate.

Tubes which have been found to work well for tube 55 are in general miniature triodes (for low input capacity) which have a plate current rating of 10 to 20 milliamperes.

Figures 6(*a*) and 6(*b*) show typical sync output waveforms. A peak-to-peak amplitude of about 20 volts can be readily obtained. In Figure 6(*a*) it may be seen that there is a small amount of extraneous signal 95 just following the sync pulse 96. This is caused by the capacity between the plate and grid of the AGC tube 57 serving as a feedthrough path for the high frequency components in the back edge of the large keying pulse applied to the plate. In Figure 6(*b*), which shows the waveform of the sync output during the vertical synchronizing pulse period, there is a noticeable variation in the base line (beginning during the vertical sync pulse period) due to the connection to the vertical integrating network and blocking oscillator of the receiver. However, during the positive part of the sync output the output impedance of tube 55 becomes so low that coupling from the AGC pulse or other circuits has little effect upon it.

*AGC tube 57 and its circuit*

In Figure 3, tube 57 is a form of keyed AGC tube, which can conduct only when a keying pulse applied to its anode through capacitor 85 is more positive than $E_2$. $E_2$ is the potential at the cathode of tube 57. When tube 57 conducts capacitor 85 accumulates a charge. Between keying pulses capacitor 85 discharges through resistor 83 and through the AGC filter circuit 51, thus producing an average negative voltage both at the anode of tube 57 and across the AGC filter 51. The voltage thus developed is proportional to the amount of conduction occurring in tube 57. This amount of conduction is controlled by the grid potential during the keying pulses. In operation, therefore, there must be at least some degree of coincidence between the incoming sync pulses and the keying pulses. Flyback pulses derived from the receiver's horizontal output transformer can be used as keying pulses.

Referring again to Figure 6(*a*), it can be seen that two levels are indicated near the top of the sync pulses. The upper one 97 is the sync output level when there is maximum input to the first sync separator tube 53 as, for example, during noise pulses. The lower one 99 is the lowest level at which conduction in tube 57 will occur during keying. In normal operation the peaks of sync remain between these levels. The level 101 of the base line of the sync is detemined by the voltage divider comprising resistors 67 and 69.

In order to keep the sync amplitude fairly constant from strong to weak stations, the operating range between levels 97 and 99 should be restricted by keeping the two indicated levels close together. This also results in the desirable condition in which noise peaks are clipped at a level which is only slightly greater than sync peaks. The two levels may be kept close together by using a sharp cutoff tube as tube 57; a high-mu triode like the 6AV6 or ½ of a 12AX7 being suitable in some types of receivers, or a sharp cutoff pentode can be used.

DESCRIPTION AND OPERATION OF THE CIRCUIT OF FIGURE 7

Figure 7 shows another embodiment of the present invention, in which the bias of the synchronizing signal separator is not fixed as in the circuit of Figure 3, but is variable so that it is lowered to follow the video output on very weak signals. This will be termed "weak signal compensation." The same reference numerals used in Figure 3 have been used in Figure 7 to denote similar parts.

As shown in Figure 7, the video amplifier 31 is conventional except for the video load resistance which has been split into two branches, one connected to the cathode of the first sync separator 53 (point 41) instead of directly to the supply voltage. Using this connection, the video amplifier 31 operates with normal gain and load impedance during the video portion of the signal since the grid and cathode of tube 53 act as a diode clamp to prevent point 41 from becoming more than slightly negative with respect to $E_1$. However, during the sync portion of the signal, tube 53 approaches cutoff, making the impedance seen by the video amplifier at point 41 large compared to its value during the video portion of the signal, and large compared to the video load resistance; thus the sync portion of the signal is amplified more at point 41 than it would be by conventional video amplifier circuits. In other words, the video amplifier "sees" point 41 as a high impedance during the sync portion and a low impedance during the video portion of the signal, resulting in amplified sync and compressed video signal at that point.

The solid line 89 in Figure 4 represents the signal at point 41 with reference to the voltages $E_1$ and cutoff of tube 53; while the dotted curve 91 represents the video portion of the voltage at point 41 that would appear if the clamping action of tube 53 were not functioning.

The voltage appearing at the anode of tube 53 is an amplified version of the signal at point 41, except that the tops of the sync are somewhat compressed. Because the input to tube 53 is to the cathode, the output has the same phase as the input i. e., there is not the usual phase reversal in the amplifier stage.

As tube 53 approaches cutoff its gain decreases and for this reason the tips of sync are compressed in the plate circuit as compared to the cathode circuit. This compression is desirable because it clips the noise impulses and results in nearly constant-amplitude sync pulses.

The output of tube 53 is applied to the grid of a keyed AGC tube 57. Because of the clipping of the noise impulses close to sync tips by tube 53, the noise immunity of this AGC circuit is better than that of conventional keyed AGC circuits.

The output of tube 53 is also applied to a second sync separator 55. It is permissible but not necessary for the second sync separator to be self-biasing, again because the noises have been clipped by tube 53. Positive sync appears at the cathode of tube 55 and negative sync appears at the plate. The amplitude of this sync was in the order of 5 to 10 volts for this particular circuit.

It will be noted that a number of points in the circuit of Figure 7 are connected to the anode voltage supply line 105 of one of the gain-controlled I. F. amplifiers. The voltage variation at 105 is as follows: When the incoming signal strength is up, the voltage at 105 is more positive; when the incoming signal strength is down, the voltage at 105 is less positive. The connections made to the anode voltage supply line of one of the gain-controlled I. F. amplifiers could also have been made to the screen grid voltage supply line, with the same results. The connection could thus have been made to the voltage supply line of one of the "electron collecting electrodes" of one of the gain-controlled I. F. amplifiers.

First, the grid of the sync separator tube 53 is connected to point 105. Using this point 105 to bias the combination sync separator and AGC amplifier tube 53 adds another stage of amplification in the gain control loop, one that is particularly effective in the weak signal region where the normal AGC is less effective. This D. C. amplification multiplies the gain of the rest of the AGC circuit resulting in a very high loop gain which operates primarily to provide automatic tracking between the level of the video output and the bias on the combination first sync separator and AGC amplifier tube 53. As compared to a conventional AGC loop there are thus two additional stages of amplification. Since the additional amplification holds the video output to a level determined by the I. F. anode voltage rather than to a fixed delay voltage, the resulting video output voltage vs. R. F. input voltage characteristic of the receiver is not as flat as that of the receiver with a conventional high-gain delayed AGC circuit.

When receiving extremely weak signals the bias or reference voltage must fall at least as much as the video output would on a similar receiver with conventional sync and AGC circuits. Actually, additional drop is allowed to provide an adequate safety factor against loss of sync on weak signals with weak tubes, etc. As a result, some AGC voltage is developed on even the weakest signals. This is desirable in the sense that it insures adequate bias control for these weak signals, but does decrease the available output of the receiver for some of the weaker signal range. Since the greatest anode current change in the gain controlled I. F. amplifiers occurs in the low AGC bias region where the percentage gain change is relatively low, the reduction of maximum receiver gain by use of this system is not great.

Another effect of the weak signal compensation is that, since the sync separator bias follows the signal level, the noise clipping level of the sync separator also follows, remaining close to the sync peaks for weak as well as strong signals, thereby maintaining good noise immunity for signal levels that would be below the AGC threshold in a conventional receiver.

Still another result is that since in the video output the sync peak level is controlled by the external bias on the sync separator, that bias is very useful in maintaining background level in the presence of rapid or large signal level changes.

The value of the resistance in series with the anode returns of the gain controlled I. F. stages may be chosen to give a sufficient voltage drop across it, so that when there is no signal and I. F. bias of approximately one volt is developed. The voltage $E_1$ should then be checked to be sure it is well above the "knee" of the $I_p$ vs. $E_p$ characteristic for the I. F. tubes for those operating conditions. Altering the relative resistances in the video amplifier affects the amount of compensation needed. The screen supply circuit for the gain controlled I. F. stages also affects the compensation. In the particular receiver from which the circuit of Figure 7 was derived the screens were connected through small decoupling resistors to the plus 150-volt supply point. Where it is desired to make the overall circuit performance tolerate several-fold changes in transconductance of the gain-controlled I. F. tubes the screens of these tubes should be supplied from a higher voltage point through somewhat smaller than normal series resistor and the weak signal compensation readjusted to result in somewhat more than 1 volt of I. F. bias on no signal. Since there will always be some bias the operating screen voltages on zero signal may be higher than normal without exceeding the screen dissipation rating of the tube.

The control electrode 109 of the kinescope 35 is connected to point 105 through circuit 111. This connection tends to reduce brightness modulation in the picture by making the cathode 113 and the control electrode 109 vary together in the presence of disturbances such as "airplane flutter." This particular feature is described and claimed in a now abandoned U. S. Patent application, Serial No. 296,152, entitled "Television Receivers," and filed June 28, 1952, by Marlin G. Kroger and Eugene O. Keizer.

While the video amplifier screen voltage may be supplied directly from a fixed voltage, it has been found helpful to supply it from $E_1$ as an aid in weak signal compensation. A large series screen resistor supplied from a relatively high supply voltage would also help weak signal compensation but would have the disadvantage that the average video output affects sync height and AGC level and can lead to somewhat poor synchronizing on an all-black signal.

Referring to Figure 8, there is shown a television receiver including another embodiment of the present invention, as well as a novel automatic gain control circuit 117 and a novel noise charging circuit 119.

The synchronizing signal separator circuit of Figure 8, which comprises tubes 53 and 55, is similar to that of Figure 7 except for the following modifications. The output of the video amplifier 31 is applied to a control grid of the first synchronizing signal separator 53, whereas in the circuit of Figure 7 it was applied to the cathode of the synchronizing signal separator 53. In Figure 8, the operation of tube 53 is somewhat different, in that it should conduct only during the application of synchronizing pulses to its control electrode, whereas in the circuit of Figure 7, tube 53 was fully conducting except during the application of synchronizing pulses to its cathode. In the circuit of Figure 8, the limiting of noise pulses is due to plate saturation in the synchronizing signal separator 53, and to a grid limiting action. This grid limiting action is such that, when a noise pulse is of sufficient amplitude to draw grid current in tube 53, the potential developed by that grid current tends to be across resistor 121, rather than between the grid and cathode of tube 53.

It will be noted that, whereas in Figure 7 the control electrode of the synchronizing signal separator 53 was connected to point 105 (potential $E_1$), in Figure 8 it is the cathode of the synchronizing signal separator 53 that is connected to point 105. Thus, in the embodiments of both Figures 7 and 8, a variable external bias is applied to the synchronizing signal separator 53. As was seen in Figure 7, the reception of a weak signal had a tendency to lower the potential at the cathode of synchronizing signal separator 53; while the connection of the control grid to point 105 had a tendency to lower also the bias on the control grid of synchronizing signal separator 53. In Figure 8, since the reception of a weak signal tends to reduce the potential on the control grid of the synchronizing signal separator 53, the connection of point 105 is to the cathode of the synchronizing signal separator 53, and the effect is the same as that of Figure 7.

Since the output separated synchronizing pulses at the anode of tube 53 are negative, whereas in Figure 7 they were positive, the output of tube 55 in Figure 8 is taken from its anode (instead of from its cathode as in Figure 7); and the input to the AGC circuit 117 is to the cathode of tube 123, whereas in Figure 7 it was to the control grid of tube 57.

The novel automatic gain control circuit 117 comprises a triode section 123 and another triode section 125. The anode of the synchronizing signal separator 53 is connected to the cathode of the triode section 123 to apply separated synchronizing pulses thereto with such polarity as to increase the conduction in triode section 123. The control grid of triode section 123 is connected through a noise charging circuit 119 to a source of bias, such as resistor 127. This bias is such that the triode section 123 will not conduct except when the peaks separated synchronizing pulses which are applied to its cathode approach the limiting level of tube 53. The noise charging circuit, whose operation will be explained later, comprises resistor 129 and capacitor 131. The anode of triode section 123 is connected to the cathode of triode section 125. A charging capacitor 133 is connected between cathode of triode section 125 and ground. The control grid and the anode of triode section 125 are shown connected together, and to the AGC filter 51, whose output may be applied to one of the I. F. amplifiers to control the gain of the receiver. Positive keying pulses, which may be obtained at point 87 from the horizontal deflection circuit included in box 45, are applied to the anode and control grid of triode section 125 through capacitor 85. The magnitude of these keying pulses may be of the order of +700 volts.

The operation of the automatic gain control circuit 117 is as follows:

Negative going synchronizing pulses, applied to the cathode of triode section 123, cause triode section 123 to conduct. This conduction charges capacitor 133, and thus lowers the cathode potential of triode section 125 until such time as a positive keying pulse is applied to the anode of triode section 125. This keying pulse causes the triode section 125 to conduct, thus raising the potential of its cathode and charging capacitor 133 in a positive direction. If the keying pulse coincides with the separated synchronizing pulse, both triode sections 123 and 125 will conduct at the same time. If the keying pulse and the separated synchronizing pulse do not coincide, the conduction in the triode section 125 will depend upon the prior conduction of triode section 123 which will have lowered the positive charge on capacitor 133, and the development of an automatic gain control potential will still result. If the capacitor 133 is removed from the circuit, the circuit will still work, but only when the keying pulse and the separated synchronizing pulse coincide.

The operation of the novel noise charging circuit 119 will now be explained:

When noise occurs, conduction in the triode section 123 is increased and grid current results. When grid current occurs, electrons accumulate a negative charge on the ungrounded plate of capacitor 131, thus reducing the potential at point 135. The negative charge accumulated on capacitor 131 leaks through resistor 129. The time constant of capacitor 131 and resistor 129 is preferably several lines or more. The reduction in potential at point 135 tends to reduce the conduction in triode section 123. This reduction in potential has the same effect on the conduction in triode section 123 as would a reduction in incoming signal strength.

Thus, the occurrence of impulse noise, which has the same effect on the automatic gain control circuit as an increase in incoming signal strength, will also develop through the action of the noise charging circuit 119, another effect similar to a reduction of incoming signal strength. Therefore, a compensating action takes place.

It will be noted that if the time constant of the noise charging circuit 119 is long, the noise charging circuit will over-compensate for noise, namely, the occurrence of noise will have the same effect on the AGC circuit as a reduction in incoming signal strength. If the time constant is short, there will be under-compensation for noise. In the circuit of Figure 8 no critical balance of compensation is required; it is better to have over-compensation, because in that case the signal appears weaker to the AGC when noise occurs. This makes the AGC increase the amplification of the received signal to the extent that the tips of the synchronizing pulses get closer to the upper clipping level of the synchronizing signal separator 53, thus reducing the amount of noise extending above the tips of the synchronizing pulses.

Considerable variation in circuit arrangement is possible within the scope of the present invention, so long as the video amplifier 31 is D. C.-coupled to the second detector, and the output of the video amplifier 31 was D. C.-coupled to a combination sync separator and AGC amplifier 53 whose bias is obtained externally either from a fixed voltage or from a point controlled by the AGC voltage. For example, it was seen that cathode input to the combination first sync separator and AGC amplifier 53 may be used in some cases while grid input may be used in others. The second sync separator 55 may be used with either A. C- or D. C.-coupling to the output of the first. The AGC action itself may be either keyed or non-keyed (but responsive to sync peak signal level rather than to average signal level).

The cathode-input type first sync separator version of the circuit is particularly applicable to receivers having horizontal control circuits of the balanced phase detector type, where some rounding of the horizontal sync waveform is permissible.

What is claimed is:

1. In a radio receiver adapted to receive and demodulate modulated signals of the television type, said signals including a recurrent synchronizing pulse component, amplifier means including electron discharge tube means having an electron collecting electrode for the modulated signal, means connected to said amplifier means to obtain demodulated signals, a limiter, means to apply said demodulated signals to said limiter with their direct current component preserved, means to connect said limiter to a source of variable bias obtained from an electron collecting electrode of said amplifier means so that its limiting level will be at a signal level close to but greater than the level of the tips of the synchronizing pulse component of said demodulated signal, an automatic gain control circuit connected with said limiter to obtain a control potential which is a function of the potential difference between said limiting level and the instantaneous level of the tips of the synchronizing pulse component of said demodulated signal, and means to apply said control potential to said amplifier means for controlling the gain thereof in a direction tending to maintain a given signal level differential between said synchronizing pulse tips and said limiting level.

2. In a radio receiver adapted to receive and demodulate modulated signals of the television type, said signals including a recurrent synchronizing pulse component, amplifier means including electron discharge tube means having an electron collecting electrode for the modulated signal, means connected to said amplifier means to obtain demodulated signals, a synchronizing signal separator having a controllable limiting level, means to apply said demodulated signals to said synchronizing signal separator with their direct current component preserved, means to connect said synchronizing signal separator to a source of variable bias obtained from an electron collecting electrode of said amplifier means so that its limiting level will be at a signal level close to but greater than the level of the tips of the synchronizing pulse component of said demodulated signal, an automatic gain control circuit connected with said synchronizing signal separator to obtain a control potential which is a function of the potential difference between said limiting level and the instantaneous level of the tips of the synchronizing pulse component of said demodulated signals, means to connect said automatic gain control circuit to said synchronizing signal separator, and means to apply said control potential to said amplifier means for controlling the gain thereof in a direction tending to maintain a given signal level differential between said synchronizing pulse tips and said limiting level.

3. In a television receiver, adapted to receive a television signal including a synchronizing pulse component, a video amplifier having an output terminal, a synchronizing signal separator comprising a unilateral conduction device having a cathode and an anode, connecting means including a resistance between the output terminal of the video amplifier and the cathode of said synchronizing signal separator to apply television signals thereto with such polarity that the synchronizing pulse component of said signals tends to decrease conduction in said unilateral conduction device, means to apply to said unilateral coduction device a bias such that the conduction therethrough is materially decreased during the application of the synchronizing pulse component of said signal to its cathode, and gain control means coupled with said anode to reduce, at the cathode of said unilateral conduction device, variations in signal amplitude due to variations in incoming signal strength.

4. In a television receiver, adapted to receive and demodulate a television signal including a synchronizing pulse component, first amplifier means for the modulated signal, a detector connected to said first amplifier means, a video amplifier connected to said detector and having an output terminal, a synchronizing signal separator comprising a unilateral conduction device having a cathode, a control electrode, and an anode, connecting means including a resistance between the output terminal of the video amplifier and the cathode of said synchronizing signal separator to apply television signals thereto with such polarity that the synchronizing pulse component of said signals tends to decrease conduction in said unilateral conduction device, means to apply to the control electrode of said unilateral conduction device a bias such that the conduction therethrough is materially decreased during the application of the synchronizing pulse component of said signal to its cathode, and gain control means connected between said synchronizing signal separator and said first amplifier means to reduce, at the cathode of said unilateral conduction device, variations in signal amplitude due to variations in incoming signal strength.

5. Apparatus according to claim 4 wherein said bias is variable and obtained from an electron collecting electrode of one of said first amplifier means.

6. In a television receiver, adapted to receive a television signal including a synchronizing pulse component, a video amplifier having an output terminal, a synchronizing signal separator comprising a unilateral conduction device having a cathode, a control electrode and an anode, a source of potential, a first resistance connected between the anode of said unilateral conduction device and said source of potential, a second resistance connected between the cathode of said unilateral conduction device and said source of potential, connecting means including a resistance between the output terminal of the video amplifier and the cathode of said synchronizing signal separator to apply television signals thereto with such polarity that the synchronizing pulse component of said signals tends to decrease conduction in said unilateral conduction device, means to apply to the control electrode of said unilateral conduction device a bias such that the conduction therethrough is materially decreased during the application of the synchronizing pulse component of said signal to its cathode, and gain control means to reduce, at the cathode of said unilateral conduction device, variations in signal amplitude due to variations in incoming signal strength.

References Cited in the file of this patent

UNITED STATES PATENTS

| | | |
|---|---|---|
| 2,451,632 | Oliver | Oct. 19, 1948 |
| 2,520,012 | Montgomery | Aug. 22, 1950 |
| 2,585,883 | Wendt et al. | Feb. 12, 1952 |
| 2,586,760 | Bedford | Feb. 19, 1952 |
| 2,609,443 | Avins | Sept. 2, 1952 |